J. JENSEN.
BLANK BARS FOR WAGON-TONGUE CAPS.

No. 171,288. Patented Dec. 21, 1875.

UNITED STATES PATENT OFFICE.

JENS JENSEN, OF RACINE, WISCONSIN.

IMPROVEMENT IN BLANK BARS FOR WAGON-TONGUE CAPS.

Specification forming part of Letters Patent No. 171,288, dated December 21, 1875; application filed July 7, 1875.

*To all whom it may concern:*

Be it known that I, JENS JENSEN, of Racine, in the county of Racine and State of Wisconsin, have invented certain new and useful Improvements in the Manufacture of Tongue-Caps and Holdbacks for Vehicle-Poles; and I do hereby declare that the following is a full, clear, and exact description thereof, which will enable others skilled in the art to which it pertains to make and use the same, reference being had to the accompanying drawings, and to the letters of reference marked thereon, which form a part of this specification, and in which—

Figure 1:
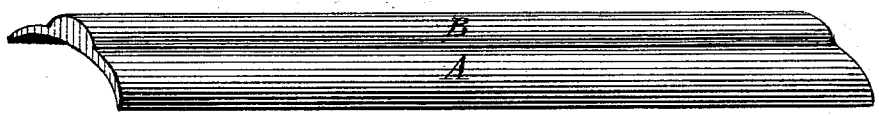
Figure 2:
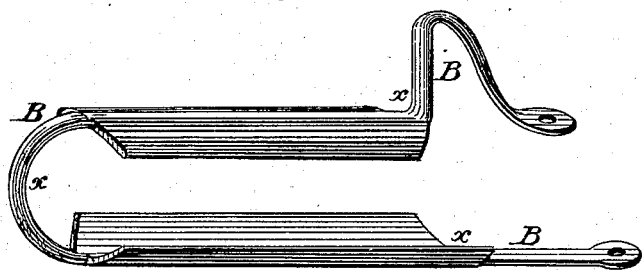

Figure 1 is a perspective view of the bar from which my improved tongue-cap and holdback is manufactured, and Fig. 2 is a perspective view of a tongue-cap and holdback manufactured from the bar shown in Fig. 1, finished.

Similar letters of reference indicate corresponding parts.

This invention has for its object the making of tongue-caps and holdbacks in one solid piece, without welding, for the purpose of economizing in labor and material, and producing a stronger and more durable article.

The iron is rolled in long bars, of the configuration shown in Fig. 1, which is cut up in suitable lengths and shapes for the tongue-cap and holdback represented in Fig. 2— that is to say, the sides or flaps of the bar (denoted by A in Fig. 1) are cut away at the places indicated by $x$ in Fig. 2, so as to leave only the rib or thick middle part B, which is bent into the requisite shape for forming the tongue-cap or holdback, as shown on Fig. 2 in the drawing.

By this method, and by using a suitable die and drop for stamping the bar represented in Fig. 1 into the blank from which, by bending the middle rib, the tongue-cap and holdback is made, this may be manufactured at a very considerable reduction of expense, and considerably stronger than when made after the old method—that is, by welding the side flaps, (denoted by A) onto the middle piece or rib B. Suitable holes are drilled through the rib B for screws or holes, by which to secure the cap to the end of the pole.

Having thus described my invention, I claim and desire to secure by Letters Patent of the United States—

A bar or blank for the manufacture of tongue-caps and holdbacks for vehicle-poles, consisting of a central raised middle or rib, B, and two curved side wings or flaps, A, substantially as and for the purpose hereinbefore set forth.

In testimony that I claim the foregoing as my own, I have hereto affixed my signature in presence of two witnesses.

JENS JENSEN.

Witnesses:
J. A. BEAUGRAND,
G. C. COMOE.